United States Patent [19]
Berrebi et al.

[11] Patent Number: 5,139,983
[45] Date of Patent: Aug. 18, 1992

[54] PROCESS FOR THE PRESULPHURIZATION OF A HYDROCARBON TREATMENT CATALYST

[75] Inventors: Georges Berrebi, Bourg les Valences; Bernard Le Gall, La Voulte sur Rhone, both of France

[73] Assignee: Europeenne de Retraitement de Catalyseurs (Eurecat), La Voulte sur Rhone, France

[21] Appl. No.: 671,611

[22] Filed: Mar. 19, 1991

[30] Foreign Application Priority Data

Mar. 19, 1990 [FR] France ................... 90 03596

[51] Int. Cl.$^5$ ............ B01J 37/20; B01J 27/043; B01J 27/049; B01J 27/051
[52] U.S. Cl. ............................ 502/33; 502/22; 502/31; 502/150; 502/168; 502/219; 502/220; 502/221; 502/222; 502/223
[58] Field of Search ............ 502/22, 31, 150, 168, 502/219-223, 33

[56] References Cited

U.S. PATENT DOCUMENTS

| 2,232,909 | 2/1941 | Gohr | 502/220 |
| 4,530,917 | 7/1985 | Berrebi | 502/220 |
| 4,719,195 | 1/1988 | Toulhoat et al. | 502/216 |
| 4,943,547 | 7/1990 | Seamans et al. | 502/220 |
| 5,041,404 | 8/1991 | Seamans et al. | 502/150 |

Primary Examiner—Paul E. Konopka
Attorney, Agent, or Firm—Millen, White & Zelano

[57] ABSTRACT

The invention relates to a process making it possible when a refining catalyst is subject preferably in situ to the conventional activation reaction in the presence of hydrogen (generally at above 100° C.) to carry out, as a result of the in situ presence of hydrogen, the sulphurization at the required stoichiometric or non-stoichiometric level of the active metal or metals in the composition of the catalyst. In the absence of hydrogen, the process consists of incorporating into the porosity of the new or regenerated catalyst at least one sulphurizing agent of general formula:

$$R-S(n)-R'$$

in which n is an integer from 3 to 20 and R represents an organic radical.

The invention is characterized in that a critical elementary sulphur quantity is added to the sulphurizing agent. This addition makes it possible to adjust the sulphur content of the presulphurized catalyst to values equal to or higher than stoichiometry, to increase the fixed sulphur quantity after activation under hydrogen and to reduce the exothermy phenomena observed during activation.

17 Claims, 3 Drawing Sheets

PROCESS FOR THE PRESULPHURIZATION OF A HYDROCARBON TREATMENT CATALYST

DESCRIPTION

The present invention relates to a process for the presulphurization of a hydrocarbon treatment catalyst and/or the preconditioning of a catalyst which is then sulphurized.

It is often desirable to carry out a sulphurization (generally called presulphurization) of metals used in the composition of certain hydrocarbon refining and/or hydroconversion catalysts either when these catalysts are new or fresh, or following the regeneration of the said catalysts and prior to the reuse thereof.

Therefore a presulphurization of the new or regenerated catalysts is desirable for their use in refining reactions, e.g. the desulphurization or hydrodesulphurization reactions of various petrol types, e.g. steam cracking or catalytic cracking petrols, whose sulphur content should be lowered prior to use without modifying or only causing a minimum modification of the octane rating thereof. Such desulphurization reactions are generally performed in the presence of hydrogen, the charge being e.g. a petrol generally distilling between 30° and 220° C. and which can have a bromine rating between 40 and 80 g/100 g and containing approximately 15 to 45% by volume of olefins (essentially monoolefins and minimum diolefin quantities) and 15 to 25% aromatic hydrocarbons. The catalyst used for this type of desulphurization or hydrodesulphurization contains a generally non-acid support, e.g. an alumina or mixtures of alumina (U.S. Pat. No. 4,334,982) or any other adequate support based on at least one oxide of a metal or a non-metal (magnesia—U.S. Pat. Nos. 4,132,632 and 4,140,626), silica, aluminosilica, magnesiosilica, fluorosilica, boroalumina, clays, charcoals, fluoroalumina, etc. The said support mixtures can at least partly be in amorphous or crystalline form (zeolites) and the catalyst also contains 0.2 to 30% of at least one active metal of groups VI or VIII or any other chosen e.g. from the group constituted by cobalt, molybdenum, nickel and tungsten (U.S. Pat. Nos. 3,732,155 and 3,804,748). Generally use is made of a pair of such metals, e.g. one of the pairs cobalt-molybdenum, nickel-molybdenum, cobalt-tungsten, tungsten-molybdenum, cobalt-nickel or nickel-tungsten. In exemplified manner it is also possible to use a precious metal of group VIII in the platinum family: Pt, Pd, etc. (U.S. Pat. No. 4,098,682).

Thus, prior to use, the new or regenerated catalyst has generally undergone in the prior art a sulphurization (presulphurization) performed in the hydrodesulphurization reactor. This sulphurization makes it possible to include in the catalyst e.g. approximately 50 to 110% of the stoichiometric sulphur quantities calculated on the sulphur quantities of formula (as a function of the metals present): $Co_9S_8$, $MoS_2$, $WS_2$ and $Ni_3S_2$.

According to the prior art, this sulphurization (presulphurization) is performed at a temperature close to or higher than the reaction temperature, i.e. higher than 180° C. and more particularly above 250° C., for the hydrodesulphurization reaction by means of a mixture of hydrogen sulphide generally diluted in hydrogen (hydrogen sulphide proportion in the hydrogen approximately 0.5 to 5% by volume) with an adequate space velocity of e.g. approximately 1,000 to 3,000 liters of gas under normal temperature and pressure conditions per liter of catalyst and per hour (U.S. Pat. No. 4,334,982). The actual sulphurization or presulphurization can be carried out in temperature ranges or stages (FR-B-2 476 118). It is possible to use various sulphurizing agents other than hydrogen sulphide ($H_2S$) and e.g. a sulphur compound from the family of mercaptans, carbon disulphide ($CS_2$), sulphides or disulphide, thiophene compounds and preferably dimethyl sulphide (DMS) and dimethyl disulphide (DMDS).

A regenerated catalyst sulphurization or presulphurization is also desirable in hydrocarbon hydroforming reactions (in particular reforming of a naphtha) and aromatic hydrocarbon production reactions (aromizing), e.g. the production of benzene, toluene and xylenes (ortho, meta or para) either from unsaturated or non-unsaturated petrols (e.g. pyrolysis, cracking, especially steam cracking or catalytic reforming petrols), or from naphthene hydrocarbons which, by dehydrogenation, can be converted into aromatic hydrocarbons.

The catalyst can e.g. contain at least one metal from the family, i.e. a precious metal such as platinum, palladium, iridium, rhodium, ruthenium, osmium, etc., deposited on an adequate support, e.g. alumina, silica, aluminosilica, fluorosilica, fluoroalumina, zeolite, etc., or mixtures of such supports. The total precious metal content is e.g. between 0.1 and 5% by weight, based on the catalyst. The catalyst may also generally contain at least one halogen (chlorine, fluorine, etc.,) with a content of 0 to 15% by weight. Optionally the catalyst contains at least one promoter metal chosen from the most varied groups in the periodic classification of elements, the content of the promoter metal e.g. varying between 0.1 and 15% by weight. Thus, reference can be made to metals of groups VIII, VI A and VI B, I B and II B, III A, IV A, V A and V B, IV B, III B, I A and I B, as well as metals from the family of lanthanides. Apart from precious or base metals of group VIII, reference is more particularly made to copper, silver, gold, germanium, tin, indium, thallium, manganese, rhenium, tungsten, molybdenum, niobium and titanium.

For these aromatic hydrocarbon production or catalyst reforming reactions, the sulphurization of the new or regenerated catalyst is accompanied by a catalyst hydrogen reduction and takes place in the top of the reactor or in the vicinity thereof. The temperature in the sulphurizing zone is imposed by the temperature at which the reduction takes place and is generally between 480° and 600° C. The difficulty of this type of in situ sulphurization, i.e. in the vicinity of the reactors has led to often complicated, although effective sulphurization processes (U.S. Pat. No. 4,172,027).

The sulphurizing agent used in the prior art, namely is either hydrogen sulphide in the pure state or diluted by hydrogen or gaseous hydrocarbons, or dimethyl disulphide diluted by hydrogen, or other sulphide compounds such as alkyl sulphides or alkyl mercaptans diluted by hydrogen. The pressure used is that prevailing in the aromatic hydrocarbon production or reforming reactor, the duration of the reaction varying from a few minutes to several days as a function of the chosen operating conditions (U.S. Pat. No. 4,172,027).

A sulphurization (presulphurization) of a new or regenerated catalyst is suitable, in certain cases, for partial or total catalyst sulphurization, also based on one of the aforementioned supports and at least one of the aforementioned active metals, usable in hydrocarbon conversions and reactions, such as hydrogenation, dehydrogenation, alkylation, hydroalkylation, dealkylation, hydrodealkylation, steam dealkylation and isomerization and hydrometallization (or demetallization) of heavy charges.

When necessary, sulphurization or presulphurization can advantageously be carried out according to one or other of the aformentioned prior art processes.

Another refining reaction particularly appropriate for such presulphurization types and in particular the presulphurization according to the present invention is hydrocracking. Hydrocracking (like other cracking processes) of heavy petroleum cuts is a very important refining process making it possible to produce from relatively non-valorizable, excess heavy charges, lighter fractions such as petrols, jet aircraft fuel and light gazoles of the type sought by the refiner to adapt his production to demand. Compared with catalytic cracking, the interest of catalytic hydrocracking is that it supplies very high quality middle distillates, jet aircraft fuels and gazoles. However, the petrol produced has a much lower octane rating than that resulting from catalytic cracking.

The catalysts used in hydrocracking are all of the bifunctional type associating an acid function with a hydrogenating function. The acid function is supplied by large surface supports (approximately 150 to 800 $m^2.g^{-1}$) having a surface acidity, such as halogenated (particularly chlorinated or fluorinated) aluminas, combinations of aluminium and boron oxides, amorphous silicoaluminas and zeolites. Zeolites are at present favoured and are used singly or mixed with an amorphous matrix.

Compared with the other aforementioned acid supports, acid zeolites lead to a much higher acidity. The new catalysts containing them are consequently much more active and therefore make it possible to work at a much lower temperature and/or higher hourly volume velocity HVV. However, this higher acidity modifies the equilibrium between the two acid and hydrogenating catalytic functions. This leads to a notable selectivity modification of these catalysts compared with conventional catalysts. They are more cracking and consequently produce much more petrol than middle distillates. However, solutions to these problems are described in EP-B-162733.

The hydrogenating function is supplied either by one or more metals of group VIII of the periodic classification of elements, such as nickel, palladium or platinum, or by an association of at least two metals chosen from among groups VI of the periodic classification, particularly molybdenum and tungsten, and VIII, particularly cobalt and nickel, whereby at least two of the metals of said association belong to two different groups (VI and VIII).

The charges used in hydrocracking are gas oil, vacuum gas oil hydrotreated or deasphalted residues or the like. At least 80% by volume thereof are constituted by compounds with boiling points between 350° and 580° C. They contain heteroatoms such as sulphur and nitrogen. The hydrocracking conditions, such as the temperature, pressure, hydrogen recycling rate, hourly volume velocity, etc., must be adapted to the nature of the charge and more particularly characterized by the boiling point range, the aromatics or polyaromatics content and the content of heteroatoms. The nitrogen contents are generally between 5 and 2000 ppm and the sulphur contents between 50 and 30,000 ppm.

The temperature generally exceeds 230° C. and is often between 300° and 430° C. The pressure is above 15 bars and generally exceeds 30 bars.

The hydrogen recycling rate is at a minimum of 100 and is often between 260 and 3,000 liters of hydrogen per liter of charge. The volume velocity is generally between 0.2 and 10.

The metals of the catalysts used in refining, hydrorefining or petrochemistry, no matter whether they are new/fresh or regenerated, are usually in oxidized form and sometimes in metallic form (particularly for certain metals of reforming catalysts). However, the metals of these catalysts are often only active in sulphurized or at least partly sulphurized form. The refiner or petrochemist therefore has to sulphurize the catalyst prior to the use thereof. At present, the regeneration of catalysts takes place to an ever increasing extent through a catalyst regeneration specialist located a long way from the industrial unit. However, it would appear reasonable to hand back to the refiner a ready-to-use product and this has led to the Applicant's European Patent EP-B-130 850, in which a sulphur compound is incorporated into the catalytic mass and causes the sulphurization or presulphurization of the catalyst when, subsequently, in the reaction zone (charge treatment zone) or in the immediate vicinity thereof, the catalyst is contacted with hydrogen. Obviously, the incorporation of said sulphur compound can, if desired, be carried out in the vicinity of the industrial unit or even where catalyst treatment takes place. In addition, the process of incorporating the sulphur compound can be carried out ex situ on a new or regenerated catalyst prior to its use in the industrial unit.

In a way specified in EP-B-130 850, the catalyst sulphurization process is characterized by a preliminary or incorporation stage into the catalytic mass of a sulphur compound of a particular nature.

The preliminary stage of introducing a sulphur compound, which is referred to as an ex situ treatment no matter whether it is performed in the vicinity of the location of the industrial unit or at a varying geographical distance therefrom (e.g. where the catalyst has been manufactured or regenerated), as opposed to an in situ pretreatment in the immediate vicinity of the reactor, i.e. at the top of reactors or in areas having a varying direct communication with such reactors and making it necessary to operate under temperature, pressure or other conditions at least partly imposed by the operating conditions of these reactors or reactor auxiliary parts (e.g. the prior hydrogenation zone for the catalyst).

In summarizing, EP-B-130 850 relates to a process which, when the catalyst from the start is preferably subjected in situ to the conventional activation reaction in the presence of hydrogen (generally at above 100° C.), to then carry out, as a result of the in situ presence of hydrogen, the sulphurization at the required stoichiometric or non-stoichiometric level of the active metal or metals used in the composition of the catalyst. In the absence of hydrogen, this process consists of incorporating into the porosity of the new or regenerated catalyst at least one sulphurizing agent of general formula:

R—S(n)—R' in which R, R' and n are as defined hereinafter.

Thus, sulphurization of the catalyst can be carried out in the following way. In a first stage performed ex situ and in the absence of hydrogen, the catalyst is treated with the aid of at least one sulphurizing agent, so as to partly or totally incorporate the said agent into the porosity of the catalyst, the sulphurizing agent being a polysulphide of general formula:

$$R-S(n)-R'$$

said sulphurizing agent being used in solution in a solvent. In a second stage performed in situ and preferably at above 150° C., the catalyst is activated in the presence of hydrogen, the requisite sulphur quantity being fixed due to the presence of hydrogen on the metal or metals used in the composition of said catalyst. This final stage is defined in EP-B-181 254. Thus, the object of these two Patents is to carry out ex situ the presulphurization of the catalysts by incorporating all the sulphur necessary and only that sulphur quantity which is required by the user. Therefore the catalysts can be supplied to the refinery or any other unit preconditioned in a manner suitable for sulphurization.

Therefore the refiner or any other user only has to reactivate the catalyst in the presence of hydrogen at a temperature of e.g. 100° to 200° C. for a desulphurization catalyst and approximately 400° to 600° C. for an aromatic hydrocarbon production or catalytic reforming catalyst, in order to react the sulphur with the metals contained and immediately start the hydrocarbon conversion or refining reaction by injecting the charge to be treated.

In the polysulphide of formula:

$$R-S(n)-R'$$

n is an integer from 3 to 20, preferably 4 to 8 and more especially 5 to 7, R and R', which can be the same or different, represent organic radicals containing in each case 1 to 50 carbon atoms per molecule, preferably 10 to 60 carbon atoms or 5 to 40 carbon atoms and more particularly 7 to 16 carbon atoms, said radicals being chosen from the group constituted by alkyl radicals, i.e. saturated or unsaturated, straight or branched or of the naphthene type, aryl radicals, alkylaryl radicals and arylalkyl radicals, whereby said radicals can have at least one heteroatom. R' can optionally also be a hydrogen atom.

As a preferred example of a polysulphide, reference is made to ditert dodecyl polysulphide (n=5), in which R and R' are in each case a tert dodecyl radical. This product is e.g. marketed by ELF AQUITAINE under the name TPS 32, because it contains approximately 32% by weight sulphur. Reference is also made to ditert nonyl polysulphide (n=5), in which R and R' are in each case a tert nonyl. This product is marketed by ELF AQUITAINE under the name TPS 37 because it contains approximately 37% by weight of sulphur, or by PENWALT under the name TNPS.

For procedural reasons, it is obviously possible to use these polysulphide-type sulphurizing agents either alone or mixed together in carefully chosen proportions.

The first aforementioned stage is performed in the absence of hydrogen and makes it possible to very accurately obtain the total or partial degree of sulphurization required by the user. The sulphur is incorporated at between 0° and 50° C. and preferably 10° and 35° C. and in an even more preferred manner at ambient temperature.

The sulphurizing agent is used diluted in an adequate solvent, which is in particular dependent on the nature of the sulphurizing agent, i.e. R or R', said radicals determining the content of sulphur incorporated into the catalyst generally by capillarity or porosity. The sulphurization processes differ as a function of the cuts to be subsequently treated in the presence of catalysts treated according to the invention. The solvent chosen can be one of the following solvents, used alone or mixed together:

- a light petrol e.g. boiling at between approximately 60° and 95° C.;
- a hexane-type petrol boiling at between approximately 63° and 68° C.;
- a F-type petrol boiling at approximately 100° to 160° C. and generally containing 10 to 20 and e.g. 15% by volume of aromatic hydrocarbons;
- a white spirit-type petrol boiling at approximately 150° to 250° C. and generally containing 14 to 22 and e.g. 17% by volume of aromatic hydrocarbons;
- or any other hydrocarbon or non-hydrocarbon cut equivalent to the aforementioned petrols.

Subsequently, on or in the vicinity of the site (where the catalyst is to be used for the treatment of various charges), during the conventional activation reaction performed in the presence of hydrogen (second stage of the process of EP-B-130 850), the sulphurizing agent introduced in a predetermined quantity into the catalyst will be able to give rise to hydrogen sulphide which, in the presence of hydrogen, will lead to the desired sulphide or sulphides of the metal or metals present in the catalyst, e.g. according to the exothermic reactions (1), (2) and (3) in the case of the sulphurization of molybdenum, cobalt and nickel:

$$MoO_3 \rightarrow MoS_2 \quad (1)$$

$$9\ CoO \rightarrow Co_9S_8 \quad (2)$$

$$3\ NiO \rightarrow Ni_3S_2 \quad (3)$$

The use of an adequate solvent, in which the sulphurizing agent is dissolved, makes it possible to act on the latent vaporization heat of the solvent chosen and therefore to at least partly absorb the exothermicity of the sulphurization reaction.

Following sulphur deposition, at least part of the solvent remains in the catalyst. It is therefore possible to eliminate this solvent, e.g. by stripping with nitrogen or any other means. However, the solvent left in the catalyst can be subsequently eliminated without damage in the catalyst use reactor, i.e. in situ.

In the first stage, the volume of the polysulphide and the chosen solvent must preferably represent a value equal to the porous volume of the catalyst bed to be treated. Thus, for example, for 100 g of regenerated or new catalyst (oxidized form), it is a question of placing approximately 9 g of sulphur in polysulphide in approximately 45 cc of total, more solvent polysulphide mixture (e.g. white spirit). This polysulphide is generally adsorbed in ambient air. The catalyst can then optionally be dried under a hot air flow and then conditioned prior to despatch to the refiner, according to a preferred method.

In the Applicant's EP-B-181 254, it has been found that during a first part of said second stage, not only is the presence of hydrogen not necessary, but in fact its absence is desirable, provided that during the end of the second stage, performed ex situ or in situ and optionally in the presence of hydrogen, the catalyst is raised for at least one minute to a temperature of at least 275° C. The first part of this second stage is performed in situ or ex situ. Thus, the first part of said second stage is performed in the absence of hydrogen under an inert gas atmosphere (nitrogen, argon, helium, etc.) or an atmosphere of a non-inert gas or a mixture of such gases, e.g. air, for approximately at least five minutes and at between 65° and 275° C. More specifically, on operating in the presence of an inert gas, working preferably takes place for approximately 1 to 3 hours under a pressure between approximately 0.5 and 70 bars (0.05 and 7 MPa), at a temperature between 65° and 275° C., preferably between 85° and 260° C. and more particularly between 95° and 150° C. If it is decided to work in the presence of a non-inert gas such as air, it is appropriate to operate for approximately 5 minutes (or preferably 9 minutes) to 10 hours, under 0.5 to 70 bars (0.05 to 7 MPa), at a temperature below 200° C. and preferably below 150° C.

On working in air at a temperature below 200° C., the combustion of the fixed sulphur is started and is given off in the form of $SO_2$. This is contrary to the sought objective, but still has the advantage of working in air making it unnecessary to use the costly installations required in the case of an inert atmosphere.

During the second part of the second stage, the catalyst is either raised to a temperature of at least 275° C. for at least 1 minute, or preferably to between 300° and 400° C. when the first part of the second stage is performed at between 85° and 260° C., for between 1 and 3 hours, or between 275° and 380° C., when the first part of the second stage is performed in the presence of air, for 9 minutes to 10 hours, at a temperature below 150° C. This second part of the second stage can be performed in the presence of hydrogen.

The second part of the second stage is generally performed in situ and can therefore coincide with the starting up or putting into operation of the refining or petrochemical reaction for which is designed the catalyst prepared according to the present invention in the specific case where such a reaction is performed at above 275° C.

When the temperature chosen for the refining or petrochemical reaction is below 275° C. (e.g. this can be the case in hydrodesulphurizations of petrols or kerosenes), it is then sufficient to lower the temperature used for the activation of the catalyst in the second part of the second stage following said stage to the temperature appropriate for the refining or petrochemical reaction.

It has been found that in the first part of the second stage and despite the absence of hydrogen, the catalyst sulphurizes, i.e. the oxides of the active metals of the catalysts are transformed into sulphides according to the aforementioned chemical reactions. This phenomenon is easily observed by analyzing the catalyst, which becomes black. However, chemisorption tests have revealed that when the catalyst does not reach 275° C. and does not spend at least a few minutes at at least 275° C., said catalyst remains without catalytic activity.

It should be noted that the gas used in the first part of the second stage can at least partly be steam superheated to at least 110° C. It is also possible to use humid air. In this case it is e.g. possible to operate with a relative humidity of approximately 0 to 60% by volume in the drying stage and/or with a preactivation at between 105° and 200° C., preferably between 110° and 170° C. with a gas, whose water content is between 50 and 100% (pure steam) and preferably between 90 and 100%.

Thus, during the first part of the second stage, the oxides of the active metals are transformed into sulphides, the catalytic activity of these sulphides only appearing when the catalyst reaches approximately 275° C. and optionally in the presence of hydrogen (second part of the second stage). Thus, proceeding in this way immediately leads to several advantages. As the first part of the second stage is performed in the absence of hydrogen, the admission of hydrogen takes place later than in the process of European patent application EP-B-130 850, so that hydrogen consumption is produced. As the first part of the second stage is no longer exothermic and this is particularly advantageous for the refiner, especially from the safety standpoint, when it is carried out in situ.

Following the first part of the second stage, the catalyst is not pyrophoric provided that it has not reached approximately 275° C., i.e. it is unable to absorb oxygen (exothermic process causing the pyrophoricity of sulphurized catalysts). Therefore the said catalyst is not sensitive to air and can be handled without any special precautions. Thus, if desired, the first part of the second stage (transformation of oxides of active metals into sulphides) can be performed ex situ at the regeneration site and then, the optionally dried, air-insensitive catalyst can be transported e.g. by lorry or aircraft, not only presulphurized in the manner taught by European patent application EP-B-130 850 (sulphur incorporated into the pores of the catalyst in the form of organic polysulphide), but also sulphurized, from the regeneration site to the refiner or petrochemist. The latter then only has to place the catalyst in the refining or petrochemical unit for which the catalyst was designed and heat the catalyst to a temperature of at least 275° C. for at least 1 minute, whilst optionally introducing hydrogen into it (indispensable for the remainder of the operation of the unit). In this stage, other advantages appear both for whoever has carried out the regeneration of the catalyst and for the catalyst user, in the case where the first part of the second stage is performed ex situ. During this first part of the second stage, the solvent in which the organic solvent was dissolved evaporates (e.g. white spirit). Therefore the solvent remains at the regeneration site and is recovered by whoever has carried out the regeneration and presulphurization of the catalyst. Therefore the refiner or petrochemist does not have to provide extraction pipes for the said solvent. In addition, the water which can form in the sulphurization reactions of the oxides of active metals is eliminated at the regeneration site and the refiner or petrochemist does not have to provide water elimination pipes in their units.

During the second part of the second stage (activation), the catalyst then becomes able to adsorb oxygen, i.e. activate the refining and petrochemical reactions. This activation can be carried out in situ, i.e. in the refining or petrochemical reactor, but can also be carried out ex situ, e.g. possibly because when the refining reaction takes place at a low temperature, the reactor chosen for such a reaction may not have been designed to withstand high temperatures (mechanical stresses). It has also been found that when the catalyst is subject to the treatment of the present invention, its activity is not only improved compared with conventional sulphurization methods (e.g. by $H_2S$), but also compared with the method of EP-B-130 850. Thus, in general terms, the activity of a catalyst is inversely proportional to the catalyst volume used for carrying out a refining reaction. However, then operating according to the invention, it has been found that to obtain a same refining reaction and identical performance characteristics, use is made of approximately 5% by volume less of catalyst compared with the volume of a catalyst sulphurized by $H_2S$ and approximately 2% by volume less compared with that used of a catalyst sulphurized according to the method of EP-B-130 850.

It should be noted that for performing this second part of the second stage, it can be advantageous to operate both in the presence of hydrogen and in the presence of a liquid hydrocarbon cut, preferably e.g. use is made of at least part of the cut to be subsequently treated on the said catalyst. As the second part of the second stage is slightly exothermic, this method makes it possible to take advantage of the presence of a liquid which wets the catalyst, thereby leading to a better evaporation of calories. Moreover, this method makes it possible to improve the qualities of the catalyst.

During the first stage of the catalyst treatment process, it is possible to carry out the ex situ incorporation of the polysulphide into the porosity of the catalyst in the presence of at least one additive having reducing properties and which is chosen from the group constituted by aldehydes containing 4 to 14 (and preferably 5 to 12) carbon atoms per molecule, ketones or polyketones containing 3 to 18 (and preferably 5 to 12) carbon atoms per molecule, ethers containing 5 to 14 (and preferably 6 to 12) carbon atoms per molecule, alcohols or polyalcohols containing 5 to 14 (and preferably 6 to 12 carbon atoms per molecule) and organic acids or polyacids containing 3 to 14 (and preferably 6 to 12) carbon atoms per molecule.

By weight advantageously use is made of 0.4 to 8, preferably 0.8 to 4 and more particularly 0.9 to 3% of the additive or additives chosen based on the weight of the polysulphide or polysulphides used.

For example, the additive or additives can be added with the solution of the polysulphide or polysulphides used, either in the pure state, or dissolved in an adequate solvent. This solvent can be of the same type as that chosen for dissolving the polysulphide.

The additive or additives according to the invention can be used in another solvent such as e.g. alcohols (methanol, ethanol, propanol, etc.,) or other mineral or organic liquids for dissolving the aldehydes, ketones, ethers, alcohols, polyalcohols, acids and polyacids usable according to the present invention. Among the preferred additives reference is more particularly made to acetyl acetone, diketone, acetonyl acetone, lactic acid and citric acid.

The function of the additive used is to be able to increase, during the first part of the second stage, the degree of reduction of the metal oxides, reduce these oxides much more rapidly, thus assist the kinetics of the replacement of oxygen by sulphur and also assist the dispersion of the metals in the catalyst. Therefore the starting up of the refining and hydroconversion reactions is accelerated.

It has now been found and this forms the object of the present invention that the qualities of the methods described in EP-B-130 850 and EP-B-181 254 of the present Applicant are further improved on using organic polysulphide mixed in critical quantities with elementary sulphur instead of using said organic polysulphide alone. The use of elementary sulphur for the presulphurization of catalysts is described in U.S. Pat. No. 4,177,136, but the results obtained are relatively disappointing, although correct.

Surprisingly the use of elementary sulphur alone, which is discouraged (excessively fast start, fouling, etc.) leads to a synergy in the ex situ presulphurization when said elementary sulphur is used in mixture with organic polysulphide.

The elementary sulphur is e.g. used in the form of melted sulphur, pulverulent sulphur, flowers of sulphur, whilst applying any appropriate method, e.g. that described in EP-B-153 233 of the present Applicant.

EXAMPLE 1

Presulphurization is to be carried out of a refining catalyst based on a zeolite and an alumina matrix. The catalyst has the following composition by weight:

13% zeolite
5% NiO
18% $MoO_3$
64% alumina.

The alumina is a pseudo-boehmite obtained by the hydrolysis of an aluminium alkoxide.

The zeolite used was prepared according to a method described in EP-B-162 733 from a zeolite NaY of formula $NaAlO_2 (SiO_2)_{2.5}$ having the following characteristics:

$SiO_2/Al_2O_3$ molar ratio: 5
crystalline parameter: $24.69 \times 10^{-10}$ m
steam adsorption capacity
at 25° C. (P/Po:0.1): 26%
specific surface: 880 $m^2/g$.

This zeolite NaY undergoes two exchanges in ammonium chloride solutions in such a way that the sodium level is 2.6%. The product is then introduced into a cold furnace and calcined in air up to 400° C. At this temperature a water flow is introduced into the calcination atmosphere and corresponds, after vaporization, to a partial pressure of 50.661 Pa. The temperature is then raised to 565° C. for 2 hours. The product then undergoes an exchange with an ammonium chloride solution followed by an acid treatment under the following conditions: 0.4N hydrochloric acid volume on solid weight 10, time 3 hours. The sodium level then decreases to 0.6% and the $SiO_2/Al_2O_3$ ratio is 7.2. This product then undergoes sudden calcination under static atmospheric conditions at 780° C. and for 3 hours. It is then taken up again in an acid solution by 2N hydrochloric acid and a solution volume to zeolite weight ratio of 10. The crystalline parameter is $24.28 \times 10^{-10}$ m, the specific surface is 825 $m^2/g$, the water take-up capacity 11.7 and the sodium ion take-up capacity 1.0.

The above catalyst is presulphurized by the following six methods or tests:

1. Presulphurization by pure TPS (TPS 37 manufactured by Elf Aquitaine and containing approximately 37% by weight sulphur, the formula having been given in the general part of the present application), 100% of the sulphur coming from the TPS.
2. Presulphurization by a mixture of TPS and flowers of elementary sulphur in which 25% by weight of the sulphur comes from the flowers of elementary sulphur.
3. Presulphurization by a mixture of TPS and flowers of elementary sulphur, in which 50% by weight of the active sulphur comes from the flowers of elementary sulphur.
4. Presulphurization by a mixture of TPS and flowers of elementary sulphur, in which 65% by weight of the sulphur comes from the flowers of elementary sulphur.
5. Presulphurization by a mixture of TPS and flowers of elementary sulphur, in which 70% by weight of the sulphur comes from the flowers of elementary sulphur.
6. Presulphurization by flowers of elementary sulphur without TPS.

The sulphur quantity necessary for the stoichiometric sulphurization of the nickel and molybdenum oxides in the composition of the catalyst substantially corresponds to an elementary sulphur content of 8.8% by weight of the catalytic material. As a result of the different possible sulphur losses during the handling operation, the six tests use the quantities of sulphur and/or TPS theoretically necessary for giving the catalytic material a sulphur content of 11% by weight. For the presulphurization of the catalyst by TPS 37 (first test), the two-stage procedure of EP-B-181 254 is used:

First Stage

In order that all the polysulphide is adsorbed, it is necessary to use a reagent volume (polysulphide and polysulphide solvent) equal to the impregnation volume of the treated catalyst charge. It is the knowledge of this total porous volume or impregnation volume, which determines the solvent quantity to be used. Within the framework of the present test, for 100 g of catalyst, this volume is on average 45 ml (whereof approximately 60% is solvent and approximately 40% polysulphide). The solvent used is a white spirit with a boiling point between 150° and 250° C.

As indicated hereinbefore, use is made of a slight sulphur excess relative to stoichiometry necessary for subsequently sulphurizing all the oxides (NiO, MoO$_3$). This is followed by the dry impregnation of the catalyst and evaporation under 10 mm of mercury (13,600 Pa) or under an inert gas flow.

Second Stage

1. First part of the second stage.
   The catalyst is introduced into the reactor, which is placed under a pressure of 1 bar in the presence of a mixture of 5% by volume air and 95% by volume steam, initially superheated to 115° C. The same results would be obtained under a higher pressure, e.g. 60 bars. The catalyst is heated for 1 hour.
2. Second part of the second stage e.g. performed in situ.
   The reactor is placed cold under a hydrogen atmosphere. The pressure is raised to 60 bars and the temperature to 150° C. The hydrorefining tests are carried out and details will be given hereinafter.
   For the presulphurization of the catalyst by mixtures of TPS and flowers of elementary sulphur (tests 2, 3, 4 and 5), the procedure of the first test is used mixing the flowers of sulphur with the catalyst and impregnating the mixture with TPS 37.
   For the presulphurization of the catalyst by elementary sulphur only (test 6), it is e.g. possible to place the catalyst in a tube and cover it with powdered sulphur, heat the tube to 120° C. for at least 30 minutes, in such a way that the melted sulphur is adsorbed in the pores of the catalyst.

In general terms, no matter whether the sulphur is used alone (test 6) or with an organic polysulphide (tests 2, 3, 4 and 5), the addition thereof can either take place in a part of the installation close to the impregnating agent supply, or directly on the catalyst in the furnace, or during the impregnation of the catalyst by the polysulphide, or in the actual impregnate, or suspended in water.

Table 1 gives characteristics of the catalysts obtained after the six presulphurization tests.

The carbon percentage deposited on the presulphurized catalyst comes from the organic polysulphide and also the white spirit used for impregnating said polysulphide. The carbon percentage deposited on the catalyst is consequently low in the case where elementary sulphur alone is used (test 6), because most of the carbon comes from the carbon atoms of the polysulphide. Refiners accept a content of approximately 4 to 8%. The C % values in tests 2, 3, 4 and 5 (polysulphide-elementary sulphur mixtures), are consequently perfectly acceptable and in particular the values of tests 3, 4 and 5.

The sulphur percentage deposited on the catalyst should be 8.8%, which corresponds to stoichiometry. The values obtained in the four tests (2, 3, 4 and 5), where use is made of mixtures of TPS and elementary sulphur are much better than those obtained by using TPS alone (test 1) or elementary sulphur alone (test 6). The values obtained in test 3 (50% TPS - 50% elementary sulphur) 4 (35% TPS - 65% elementary sulphur) and 5 (25% TPS - 75% elementary sulphur) are good.

The loss on ignition values at 550° C. are given for information and give rise to no particular comment.

The values given in the table for the sulphur weight content, after extraction by solvent, correspond to the sulphur quantity remaining on the catalyst after an operation carried out by certain refiners consisting of starting the refining operation in the liquid phase.

The sudden introduction of the solvent into this type of unit operation leads to the elimination of all or part of the impregnated sulphur on the catalyst. Thus, it is shown in table 1 that in the case of such a manipulation, there is virtually no sulphur when the latter is introduced with the aid of elementary sulphur (test 6), that roughly a third thereof is left when the sulphur is introduced with the aid of TPS and that appropriate quantities thereof are left when the sulphur is introduced with the aid of mixtures of TPS and elementary sulphur (tests 2, 3, 4 and 5) with a preference for tests 3, 4 and 5.

Figure 1:
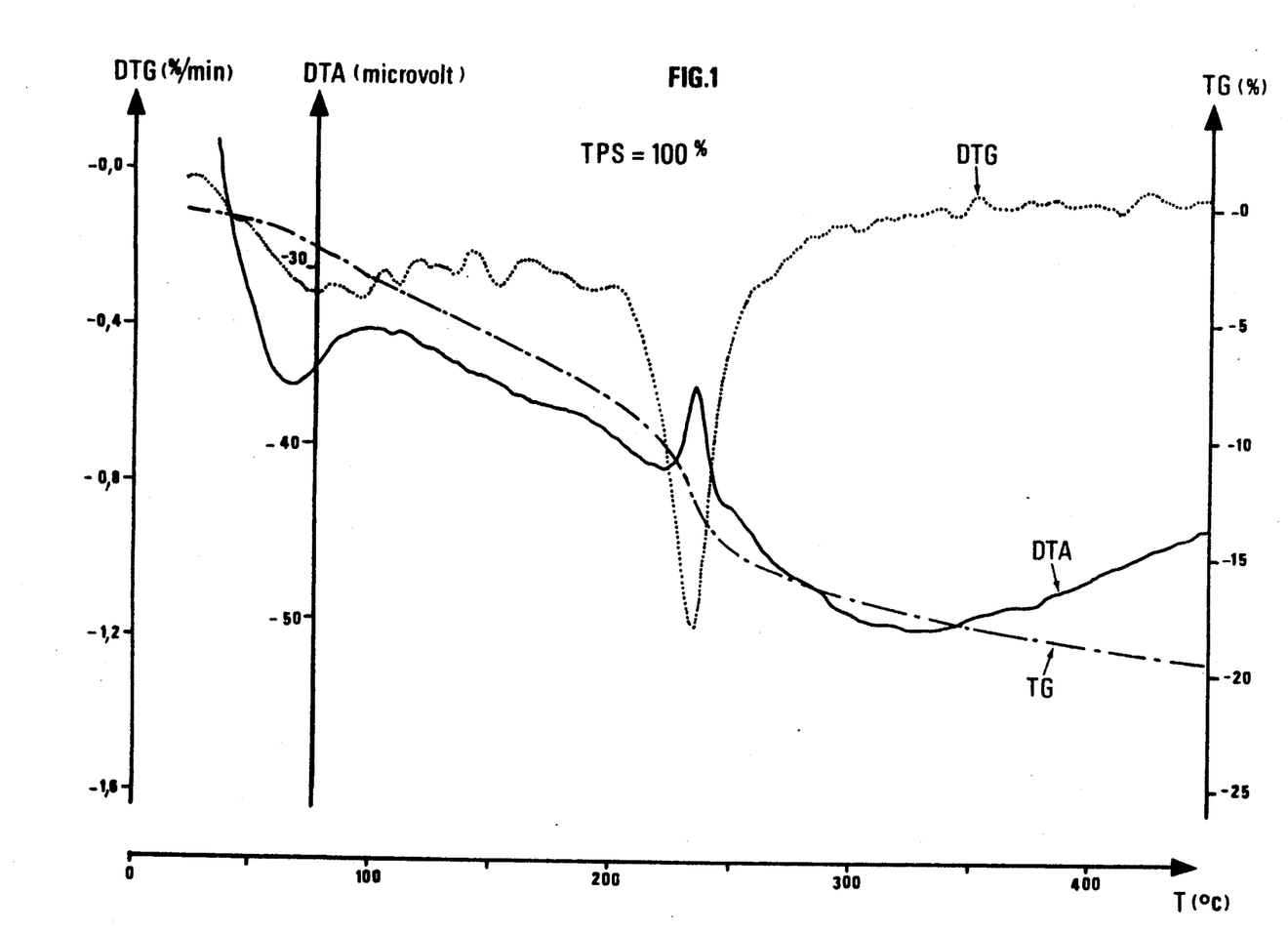
Figure 2:
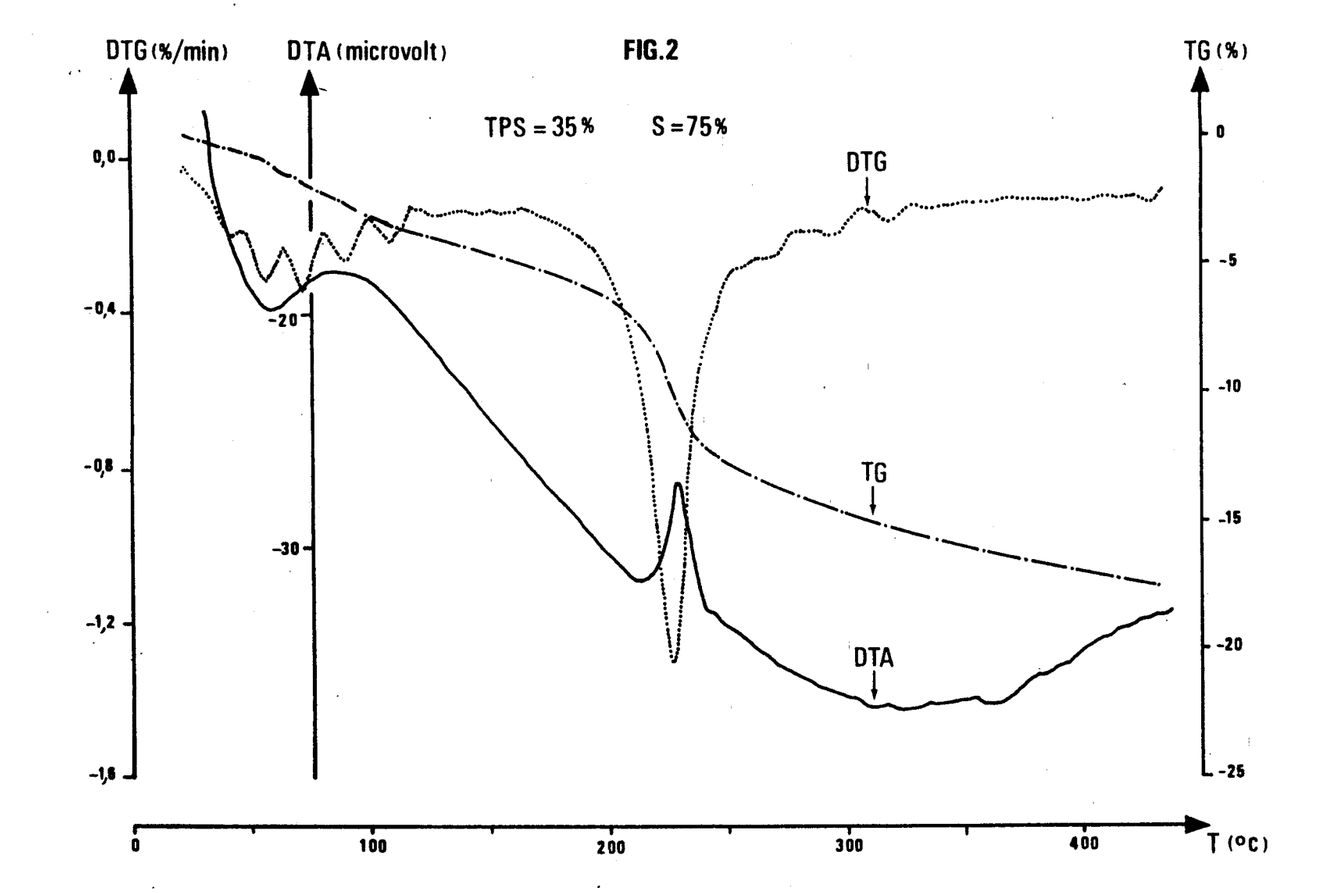
Figure 3:
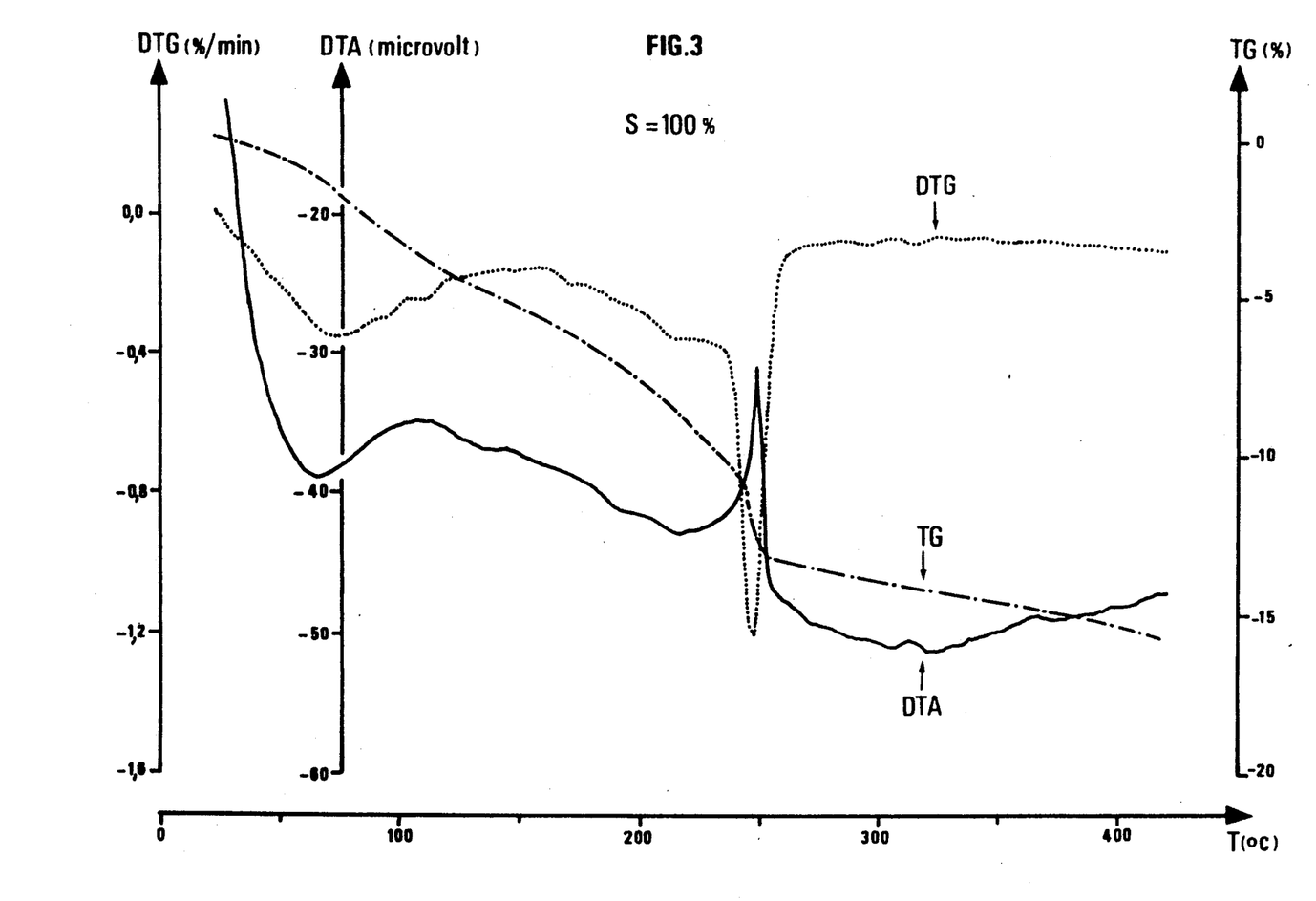

In addition, research has been carried out on the thermal behaviour under hydrogen of 3 batches of catalysts presulphurized according to tests 1 (presulphurization by TPS only), 4 (presulphurization by a mixture of TPS and elementary sulphur) and 6 (presulphurization by elementary sulphur only). Each batch was progressively heated from ambient temperature to approximately 450° C.

These thermal behaviour studies give for each batch three curves representing:
   the thermogravimetric analysis (TG curve),
   the derived thermogravimetric analysis (DTG curve),
   the differential thermal analysis (DTA curve).

For each of the 3 batches, there are exotherms which, as a function of the batches, are located at between 200° and 250° C. and which represent the activation of the catalyst. At this stage, there is a loss of weight by loss of water corresponding to the transformation of the oxides into sulphides and activation occurs at this stage. These activations are carried out here under a hydrogen atmosphere and at 1 bar (industrially the pressure is e.g. approximately 100 bars). There is in particular an exothermy at 200° C. in the TG curve of TPS 100%.

However, particular reference is made to the very rapid character of the exothermy obtained in the catalyst impregnated with elementary sulphur alone. A comparison should be made in FIG. 3 (sulphur alone), between the relatively large peak in the DTA curve compared with the corresponding peaks of the DTA curves in FIGS. 1 (TPS alone) and 2 (TPS - sulphur mixture). This is made very clear in the laboratory, where during the handling of the catalyst there was found to be a splashing of catalyst onto the edges of the analytical crucible, i.e. a violent reaction demonstrating the interest of using an adequate mixture of organic polysulphide and elementary sulphur.

In FIGS. 1, 2 and 3, the units for the ordinates of the DTG curves represent percent by weight per minute and those of the DTA curves are microvolts.

According to the invention, use is preferably made of a mixture of polysulphide and elementary sulphur containing by weight and based on the said mixture 10 to 75, more advantageously 20 to 60 and more specifically 25 to 50% sulphur coming from the polysulphide.

TABLE I

|  | TEST 1 | TEST 2 | TEST 3 | TEST 4 | TEST 5 | TEST 6 |
|---|---|---|---|---|---|---|
| C % by weight on presulphurized catalyst | 4.27 | 3.91 | 3.28 | 3.30 | 3.38 | <0.01 |
| S % by weight on presulphurized catalyst | 7.72 | 8.39 | 8.82 | 8.90 | 8.60 | 8.22 |
| Ignition loss % by weight at 500° C. | 15.20 | 16.60 | 16.00 | 16.20 | 16.70 | 12.40 |
| S % by weight after solvent extraction | 3 | 4.12 | 5.28 | 5.92 | 4.82 | 0.45 |

Test Conditions: Composition of the mixtures used for presulphurization.

| Test 1: | sulphur from TPS: | 100% |
|---|---|---|
| Test 2: | sulphur from TPS: | 75% |
|  | elementary sulphur: | 25% |
| Test 3: | sulphur from TPS: | 50% |
|  | elementary sulphur: | 50% |
| Test 4: | sulphur from TPS: | 35% |
|  | elementary sulphur: | 65% |
| Test 5: | sulphur from TPS: | 25% |
|  | elementary sulphur: | 75% |
| Test 6: | elementary sulphur: | 100% |

EXAMPLE 2

Each of the six catalyst batches used in tests 1 to 6 of the table was tested in a hydrocracking reaction.

Hydrocracking test conditions.

The catalyst, whose preparation has been described, is used under charge hydrocracking conditions whose characteristics are given below:
Charge initial point: 318
10% point: 378
50% point: 431
90% point: 467
final point: 494
density $d_4^{20}$: 0.854
N (ppm): 980
% S: 1.92

The catalytic test unit comprises a fixed bed reactor mounted in up-flow and into which are introduced 60 ml of catalyst. The pressure is 120 bar, 1000 litres are recycled per litre of charge and the hourly volume velocity is 1.

The catalysts were compared for a conversion close to 78.1% at 360° C. The conversion is defined as being the fraction of the formulation with a boiling point below 380° C. The selectivity is defined as being the fraction of the formulation with boiling points between 150° and 380° C., at the conversion.

The results are given in table II.

TABLE II

| Test No. from which the catalyst comes | Selectivity |
|---|---|
| 1 | 77.6 |
| 2 | 79.3 |
| 3 | 80.7 |
| 4 | 80.8 |
| 5 | 80.2 |
| 6 | 62.2 |

On repeating all the preceding examples with ditert dodecyl polysulphide, essentially the same results were obtained as when using ditert nonyl polysulphide.

We claim:

1. In a process for the presulphurization treatment of an active metal on an oxide support catalyst which is conducted in the absence of hydrogen employing a sulphurizing agent comprising a solvent solution of a polysulfide of the formula:

R—S(n)—R' in which n is an integer from 3 to 20 and R and R', which can be same or different, each represent an organic radical containing 1 to 150 carbon atoms per molecule selected from the group consisting of alkyl radicals, aryl radicals, alkylaryl radicals and arylalkyl radicals and R' can also represent a hydrogen atom, the improvement wherein the sulfurizing agent also comprises elemental sulphur.

2. A process according to claim 1, wherein the catalyst is treated ex situ at between 0° and 50° C.

3. Process according to claim 1, wherein the presulphurization treatment process is conducted in a first stage performed ex situ of a two stage catalyst treatment process, the second stage of which is a catalyst activation stage performed in situ and in the presence of hydrogen, in which the sulfur in the catalyst obtained in the first stage is fixed on the active metal of the catalyst.

4. Process according to claim 3, wherein the hydrogen in the second stage contains approximately 0.1 to 1% by volume of water.

5. Process according to claim 1, wherein the polysulfide is ditert dodecyl polysulphide or ditert nonyl polysulphide.

6. Process according to claim 1, wherein the catalyst is unused.

7. Process according to claim 1, wherein the catalyst is ex situ regenerated used catalyst.

8. Process according to claim 1, wherein in the formula R—S(n)—R', n is an integer between 4 and 8 and R and R' each contain 5 to 40 carbon atoms.

9. Process according to claim 1, wherein the first stage is conducted in the presence of 0.4 to 8% by weight, based on the polysulphide, of at least one additive selected from the group consisting of aldehydes containing 4 to 14 carbon atoms per molecule, ketones or polyketones containing 3 to 18 carbon atoms per molecule, ethers containing 5 to 14 carbon atoms per molecule, alcohols or polyalcohols containing 5 to 14 carbon atoms per molecule and organic polyacids or acids containing 3 to 14 carbon atoms per molecule.

10. Process according to claim 1, wherein 10 to 75%, based on the polysulphide-elemental sulphur mixture, of the sulfur deposited on the catalyst by the treatment is from the polysulfide.

11. Process according to claim 10, wherein between 20 and 60% of the deposited sulfur is from the polysulfide.

12. Process according to claim 10, wherein between 25 and 50% of the deposited sulfur is from the polysulfide.

13. In a two-stage process for the treatment of an active metal on a porous oxide support catalyst, wherein in a first stage, performed ex situ at between approximately 0° and 50° C. and in the absence of hydrogen, the catalyst is treated so as to incorporate a sulphurizing agent into the pores of the catalyst and the sulphurizing agent comprises a solution in a solvent of a polysulphide of general formula:

R—S(n—)—R' in which n is an integer from 3 to 20 and R and R' are the same or different and said two radicals represent consequently an organic radical containing 1 to 150 carbon atoms per molecule selected from the group consisting of alkyl radicals, aryl radicals, alkylaryl radicals and arylalkyl radicals, and R additionally can be a hydrogen atom, and the catalyst is then optionally dried and wherein the catalyst obtained in the first stage is (a) treated in a first part of a second stage, in the absence of hydrogen and in the presence of a gas for at least approximately 5 minutes, at a temperature between 65° and 275° C. and under a pressure between approximately 0.5 and 70 bars, and then optionally dried, and then (b) treated in a second part of the second stage for at least 1 minute at a temperature of at least 275° C., the improvement wherein the sulphurizing agent also comprises elemental sulphur.

14. Process according to claim 13, wherein the first part of the second stage is conducted in the presence of an inert gas at between 75° and 275°.

15. Process according to claim 13, wherein the first part of the second stage is conducted in the presence of air, for between 5 minutes and 10 hours at a temperature below 200° C.

16. Process according to claim 13, wherein the gas comprises steam superheated to a temperature above 110° C.

17. Process according to claim 15, wherein the air is moist air.

* * * * *